United States Patent
Kang et al.

(10) Patent No.: US 11,166,346 B2
(45) Date of Patent: Nov. 2, 2021

(54) INDUCTION DEVICE AND TEMPERATURE ADJUSTMENT METHOD

(71) Applicant: SAMSUNG ELECTRONICS CO., LTD., Suwon-si (KR)

(72) Inventors: Hong-joo Kang, Suwon-si (KR); Byung-hwan Ko, Suwon-si (KR); Eun-dae Bae, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 440 days.

(21) Appl. No.: 15/509,077

(22) PCT Filed: Jul. 15, 2015

(86) PCT No.: PCT/KR2015/007323
§ 371 (c)(1),
(2) Date: Mar. 6, 2017

(87) PCT Pub. No.: WO2016/035998
PCT Pub. Date: Mar. 10, 2016

(65) Prior Publication Data
US 2017/0303346 A1    Oct. 19, 2017

(30) Foreign Application Priority Data
Sep. 4, 2014   (KR) .......................... 10-2014-0118069

(51) Int. Cl.
*H05B 6/06*    (2006.01)
*F24C 7/08*    (2006.01)
*G06F 3/041*   (2006.01)

(52) U.S. Cl.
CPC ............. *H05B 6/062* (2013.01); *F24C 7/083* (2013.01); *G06F 3/041* (2013.01); *H05B 2213/07* (2013.01)

(58) Field of Classification Search
None
See application file for complete search history.

(56) References Cited

U.S. PATENT DOCUMENTS 6,153,837 A  *  11/2000  Garcia .................... F24C 7/083
                                                        200/18
8,441,433 B2    5/2013  Olien et al.
(Continued)

FOREIGN PATENT DOCUMENTS

CN          100533329 C      8/2009
DE     20 2004 017 133 U1    3/2005
(Continued)

OTHER PUBLICATIONS

International Search Report dated Nov. 25, 2015 in corresponding International Application No. PCT/KR2015/007323.
(Continued)

*Primary Examiner* — Ibrahime A Abraham
*Assistant Examiner* — Elizabeth M Sims
(74) *Attorney, Agent, or Firm* — Staas & Halsey LLP

(57) ABSTRACT

An induction device is disclosed. The induction device comprises: a main body having a heater; a knob attachable/detachable to/from a knob region provided on one surface of the main body; a touch sensor unit formed around the knob region and, if the knob is attached thereto, touching a protruding part provided at a lower side of the knob; and a control unit for adjusting the temperature of the heater by determining the rotation degree of the knob according to a touch position touched by the protruding part if the knob rotates in a state in which the knob is attached to the knob region.

5 Claims, 19 Drawing Sheets

(56) References Cited

U.S. PATENT DOCUMENTS

| | | | |
|---|---|---|---|
| 9,261,280 B2* | 2/2016 | Santinato | F24C 7/086 |
| 2005/0189820 A1* | 9/2005 | Blumenthal | H03K 17/97 |
| | | | 307/104 |
| 2007/0023420 A1* | 2/2007 | Gagas | H05B 6/1263 |
| | | | 219/623 |
| 2008/0068117 A1* | 3/2008 | Boss | H03K 17/97 |
| | | | 335/206 |
| 2008/0238879 A1* | 10/2008 | Jaeger | G06F 3/0383 |
| | | | 345/173 |
| 2010/0253653 A1 | 10/2010 | Stambaugh et al. | |
| 2011/0031096 A1 | 2/2011 | Baier | |
| 2012/0313767 A1* | 12/2012 | Sitarski | B60K 35/00 |
| | | | 340/425.5 |
| 2013/0200965 A1 | 8/2013 | Bondar | |
| 2013/0235000 A1* | 9/2013 | Lee | G06F 3/0362 |
| | | | 345/184 |
| 2014/0021024 A1* | 1/2014 | Heimann | H01H 25/06 |
| | | | 200/4 |
| 2014/0042004 A1 | 2/2014 | Tseng | |

FOREIGN PATENT DOCUMENTS

| | | |
|---|---|---|
| DE | 10 2008 017 779 A1 | 10/2009 |
| DE | 10 2011 002 410 A1 | 7/2012 |
| DE | 10 2011 083 460 A1 | 3/2013 |
| EP | 0 962 707 A2 | 12/1999 |
| EP | 2 693 290 A1 | 2/2014 |
| GB | 2 410 541 A | 8/2005 |
| JP | 2012-103834 | 5/2012 |
| JP | 2013-257807 | 12/2013 |
| KR | 10-2012-0004462 | 1/2012 |

OTHER PUBLICATIONS

Written Opinion dated Nov. 25, 2015 in corresponding International Application No. PCT/KR2015/007323.
European Communication dated Nov. 30, 2018 in European Patent Application No. 15837362.1.
Extended European Search Report dated May 7, 2018, in corresponding European Patent Application No. 15837362.1, 7 pgs.
Chinese Office Action dated Oct. 31, 2019 in Chinese Patent Application No. 201510557824.3.
Korean Office Action dated Jul. 27, 2020 from Korean Application No. 10-2014-0118069, 11 pages.
Canadian Office Action dated Jul. 13, 2021 from Canadian Application No. 2,960,472.

* cited by examiner

INDUCTION DEVICE AND TEMPERATURE ADJUSTMENT METHOD

CROSS-REFERENCE TO RELATED APPLICATIONS

This application is a U.S. National Stage Application, which claims the benefit under 35 U.S.C. § 371 of PCT International Patent Application No. PCT/KR2015/007323, filed Jul. 15, 2015, which claims the foreign priority benefit under 35 U.S.C. § 119 of Korean Patent Application No. 10-2014-0118069, filed Sep. 4, 2014, the contents of which are incorporated herein by reference.

TECHNICAL FIELD

The present general inventive concept generally relates to an induction device and a method for adjusting a temperature thereof, and more particularly, to an induction device that adjusts a temperature using a knob and a method for adjusting a temperature thereof.

BACKGROUND OF THE INVENTION

As a heat source for generating heat, an induction device (inductive heating device) is used. Specially, an electric cooker (or hob) is used as a cooking device for heating food using the induction device.

The electric cooker does not make any harmful gas, keeps cleanliness when cooking the food, and is controlled easily and safely since it uses electricity as an energy source. Further, the electric cooker may support diverse functions for cooking the food and achieve higher energy efficiency as compared with cooking devices using a gas burner.

The gas cooker using a conventional gas burner uses a dial-type handle (knob) in order to make a fire in the burner and adjust strength of the fire. In contrast, an electric cooker, that is, a cooker using the induction device uses a covered analogue button or a touch system for an all-in-one type body.

However, the limited input methods for the electric cooker are insufficient to satisfy user demands for various designs and manipulation methods. Further, the input methods may be unfamiliar to the users accustomed to the dial-type handle of the existing gas cooker.

DETAILED DESCRIPTION OF THE INVENTION

Technical Purpose

The present disclosure has been provided to address the aforementioned and other problems and disadvantages occurring in the related art, and an aspect of the present disclosure provides an induction device that adjusts a temperature using a knob and a method for adjusting a temperature thereof.

Means for Solving Problems

According to an embodiment of the present disclosure, there is provided an induction device. The device includes a main body configured to include a heater, a knob configured to be attachable to or detachable from a knob region provided on one surface of the main body, a touch sensor unit configured to be formed around the knob region and in response to the knob being attached to the knob region, touched by a protruding part provided at a lower side of the knob, and a control unit configured to, in response to the knob rotating in a state in which the knob is attached to the knob region, adjust a temperature of the heater by determining a degree of rotation of the knob according to a touch position touched by the protruding part.

The main body may further include a first magnetic substance arranged at a lower side of the knob region. The knob may include a second magnetic substance having opposite polarity with respect to the first magnetic substance and is attached to the knob region by gravitation between the first magnetic substance and the second magnetic substance.

The touch sensor unit may include a plurality of touch sensors arranged circlewise around the knob region. The protruding part may be formed on an edge part of a lower surface of the knob. In response to the knob rotating in a state in which the knob is attached to the knob region, the control unit may determine the degree of rotation and a direction of rotation according to an order and the number of the plurality of touch sensors touched by the protruding part.

The touch sensor unit may sense a touch of an input means other than the knob in a state in which the knob is detached from the main body. The control unit may adjust the temperature of the heater according to a touch position of the input means.

The control unit may adjust touch sensitivity of the touch sensor unit to be first sensitivity in a state in which the knob is attached to the knob region and adjust the touch sensitivity of the touch sensor unit to be second sensitivity in a state in which the knob is detached from the knob region.

The device may further include a hall sensor configured to be arranged at one side of the knob region. The control unit may determine whether the knob is attached or detached by using the hall sensor.

The heater may be a plurality of heaters. The induction device may further include a heater selection unit configured to be additionally provided outside around the touch sensor unit and in response to the knob being pushed so as to tilt in a certain direction in a state in which the knob is attached, touch the knob in a pushed direction. In response to the heater selection unit touching the knob, the control unit may select a heater corresponding to the pushed direction of the knob as a controlled heater from among the plurality of heaters.

The knob region may be formed in a dented structure dented concavely on an upper panel of the main body. The lower surface of the knob may be formed in a raised structure so as to correspond to the dented structure.

The knob region may be formed in a raised structure rose convexly on the upper panel of the main body. The lower surface of the knob may be formed in a dented structure so as to correspond to the raised structure.

According to an embodiment of the present disclosure, there is provided a method for adjusting a temperature of a heater of an induction device. The method includes determining whether a knob is attached to a knob region provided on one surface of a main body of the induction device, sensing, in response to the knob being attached to the knob region, a touch position of the knob by using a plurality of touch sensors arranged around the knob region, determining, in response to the knob rotating, a degree of rotation of the knob according to a change of the touch position, and adjusting a temperature of the heater according to the determined degree of rotation.

The plurality of touch sensors may be arranged circlewise around the knob region and touched by a protruding part formed on an edge part of a lower surface of the knob. In response to the knob rotating in a state in which the knob is attached to the knob region, the determining the degree of rotation may include determining the degree of rotation and a direction of rotation according to an order and the number of the plurality of touch sensors touched by the protruding part.

The method may further include sensing that an input means other than the knob touches at least one of the plurality of touch sensors in a state in which the knob is detached from the main body and adjusting the temperature of the heater according to a touch position of the input means.

The method may further include adjusting touch sensitivity of a touch sensor unit to be first sensitivity in response to determining that the knob is attached to the knob region and adjusting the touch sensitivity of the touch sensor unit to be second sensitivity in response to determining that the knob is detached from the knob region.

BEST MODE FOR EMBODIMENTS

Figure 1:
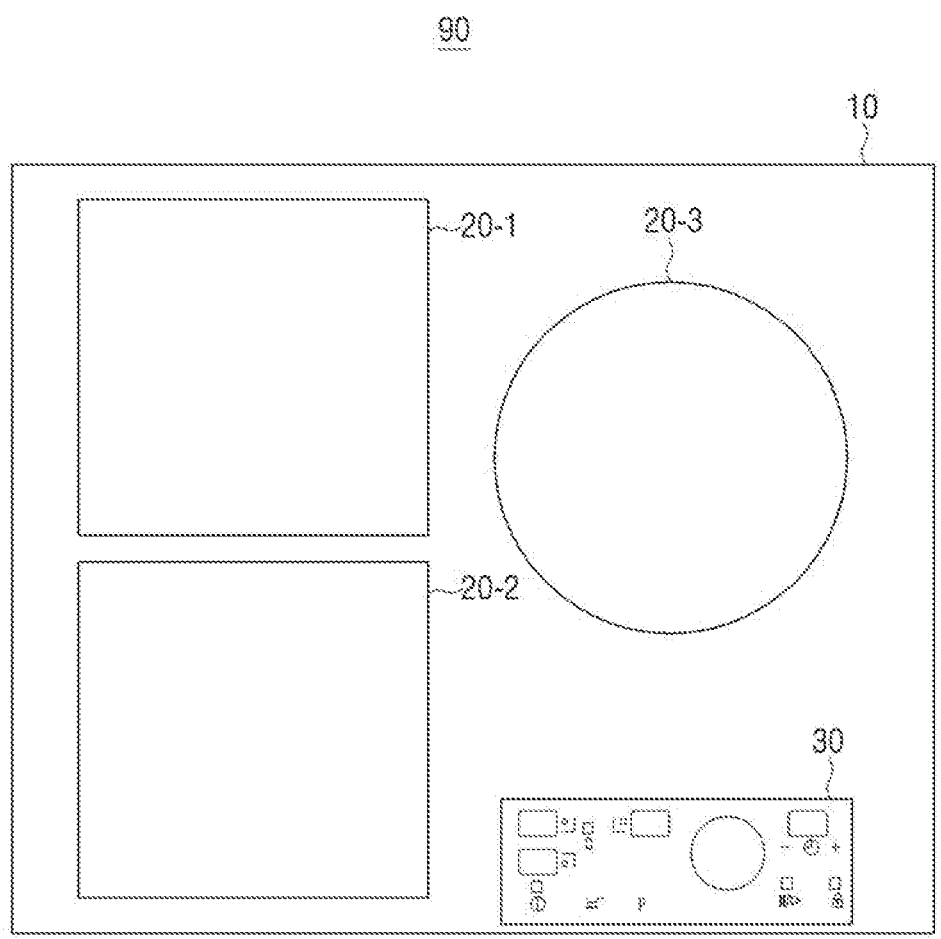
FIG. 1 is a top view of an induction device according to an embodiment disclosed herein.

Certain embodiments are described below in greater detail with reference to the accompanying drawings. In the following description, like drawing reference numerals are used for the like elements, even in different drawings. The matters defined in the description, such as detailed construction and elements, are provided to assist in a comprehensive understanding of embodiments. However, embodiments can be practiced without those specifically defined matters. Also, well-known functions or constructions are not described in detail since they would obscure the application with unnecessary detail.

FIG. 1 is a top view of an induction device according to an embodiment disclosed herein. The induction device refers to a device for heating food in an inductive heating method. The induction device may be called other various terms, such as, a cooktop, an electric cooker, an electric heating device, or the like, but it will be collectively referred to as 'induction device' in the present disclosure.

Referring to FIG. 1, an induction device 90 includes a main body 10, a plurality of cooktops 20-1, 20-2, 20-3, and a control input device 30.

The plurality of cooktops 20-1, 20-2, 20-3 include a plurality of heaters at a lower side thereof as heating sources.

In the main body 10, the plurality of cooktops 20-1, 20-2, 20-3 on the heaters may be made of heat-resisting glass, ceramic, or metal material. In FIG. 1, the induction device 90 may be realized as a closed-type device of which an upper surface is covered with single panel. In this case, certain regions of the single panel have the heaters at the lower side so as to function as the cooktops 20-1, 20-2, 20-3, and the control input device 30 is embedded at the lower side of the certain regions. This structure may prevent an inflow of the food boiled over cookware placed on the cooktops 20-1, 20-2, 20-3 into the induction device, thereby keeping great sanitary conditions. Further, the upper surface consisting of the single panel is easy to clean.

In this case, each cooktop edge of the plurality of cooktops 20-1, 20-2, 20-3 may be bordered such that a user may recognize the cooktops.

In FIG. 1, the main body 10 includes three cooktops 20-1, 20-2, 20-3, but not limited thereto. That is, the main body 10 may include one, two, or four or more heaters in the same size or different sizes.

The control input device 30 controls overall operations of the induction device 90. The user may turn on or turn off each cooktop or adjust a temperature of each cooktop through the control input device 30. Further, the user may check an operational status of the induction device 90 through various display elements or light-emitting elements of the control input device 30.

The control input device 30 has a knob region. The knob region refers to a region where a knob is attached or detached. The knob refers to a handle for controlling the operations of the induction device 90. The knob may be realized to be the same as or similar to the existing knob of a gas burner or an oven, which may induce the user to feel familiar with the induction device 90 and use the induction device 90 easily.

In response to the knob being attached to the knob region of the control input device 30, the user may adjust the temperatures of the respective cooktops by rotating the knob in a desired direction and degree.

The functions and structure of the control input device 30 will be described below in further detail with reference to FIG. 3.

The control input device 30 may be installed outside the main body 10 such that the user manipulates the control input device 30 easily. In FIG. 1, the control input device 30 is arranged to be parallel to the upper panel of the main body 10, but in the implementation, the control input device 30 may be arranged on a certain surface of the main body 10 so as to be checked and manipulated easily.

Figure 2:
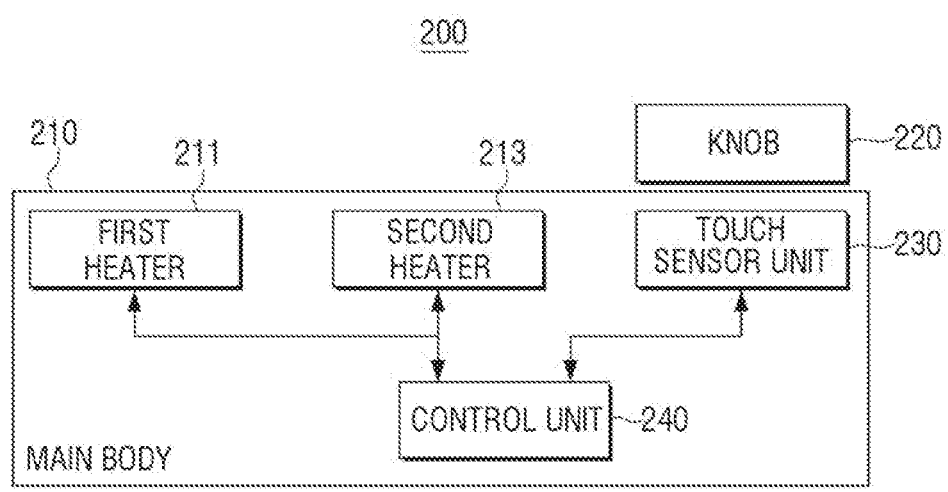
FIG. 2 is a block diagram illustrating a structure of an induction device according to an embodiment disclosed herein.

FIG. 2 is a block diagram illustrating a structure of an induction device according to an embodiment disclosed herein.

Referring to FIG. 2, an induction device 200 includes first and second heaters 211, 213, a knob 220, a touch sensor unit 230, and a control unit 240. The first and second heaters 211, 213, the touch sensor unit 230, and the control unit 240 are embedded in a main body 210 of the induction device 200. The knob 220 is realized so as to be attachable or detachable with respect to the main body 210. The first and second heaters 211, 213 are embedded at a lower side of the cooktops placed on an upper surface of the main body 210 and used as the heat source for heating the food on the cooktops. To be specific, the first and second heaters 211, 213 include induction coils and heat the food in the manner that a strong magnetic field generated by power supplied to the induction coils heats the metal, that is, the heated object. The functions and operations of the first and second heaters 211, 213 are generally known, and thus, a detailed description will be omitted.

The main body 210 may have a knob region on one surface. In response to the induction device 200 being realized to have an appearance illustrated in FIG. 1, the knob region may be formed inside the control input device 30. The knob region refers to a region where a knob is attached or detached.

The knob 220 may include a protruding part for touching a touch sensor unit 230. A detailed description for the touch sensor unit 230 will be provided below. To be specific, the protruding part may be formed on an edge part of a lower surface of the knob.

The protruding part may protrude towards a lower side of the knob 220 so as to touch the touch sensor unit 230 in a state in which the knob 220 is attached to the knob region of the main body 210. In this case, the protruding part may be made of a material suitable for being sensed by the touch sensor unit 230. For example, in response to the touch sensor unit 230 including capacitive touch sensors, the protruding part may be made of a conductive material and form single body with a handle member the knob 220 such that capacitors of the touch sensors are discharged to a body of the user holding the knob 220.

The protruding part of the knob 220 may be formed on the knob 220 in a size for touching one of a plurality of touch sensors of the touch sensor unit 230 at a time.

The protruding part of the knob 220 may be in a protruding form on a lower surface of the knob 220.

Further, a part of the surface of the knob 220 that comes into contact with the knob region of the main body 210 may be formed as the protruding part so as to touch the touch sensor unit 230.

The protruding part may include a first protrusion and a second protrusion located in a different radius from a center of the knob. In this case, the first protrusion may be a protrusion for touching the touch sensor unit 230 as the knob 220 rotates, and the second protrusion may be a protrusion for touching a heater selection unit as the knob 220 tilts.

To be specific, the first protrusion may be formed as a narrow protrusion at the lower side of the knob 220 for touching a certain region of the touch sensor unit 230 located at the lower side of the knob region. The second protrusion may be formed on an entire edge part at the lower side of the knob 220 so as to touch the heater selection unit located at the lower side of the knob region regardless of a tilting direction of the knob 220. A detailed description for the knob having a protruding part consisting of a plurality of protrusions according to the third embodiment will be provided below with reference to FIG. 12.

A method for attaching or detaching a knob may be realized in various ways according to embodiments.

In the this embodiment, the knob is attached or detached by magnetism. In this case, a first magnetic substance is embedded in a lower part of the knob region. To be specific, the first magnetic substance is embedded in the lower part of the knob region of the main body 210. A second magnetic substance has opposite polarity with respect to the first magnetic substance and is embedded in the knob 220. In response to the knob 220 approaching the knob region, the knob 220 may be attached to the knob region by gravitation between the first magnetic substance in the main body 210 and the second magnetic substance in the knob 220.

In this case, the first magnetic substance may be a ferromagnetic material where magnetic moments are arranged. For example, a permanent magnet may be used as the first magnetic substance.

The knob 220 is attached to or detached from the knob region provided on one surface of the main body 210. To be specific, the knob 220 may be attached or detached from the knob region provided so as to accommodate the knob on one surface of the main body 210. The user may control the operations of the induction device by attaching the knob 220 to the main body and rotating the knob 220.

According to the embodiments, the knob 220 may be attached to the main body 210 in various methods. According to the embodiment of attaching or detaching the knob by the magnetism, the knob 220 may include the second magnetic substance for being attached to or detached from the knob region. The second magnetic substance in the knob 220 may have the opposite polarity with respect to the first magnetic substance embedded at the lower side of the knob region and attach/detach the knob 220 to/from the main body 210 by the gravitation between the first and second magnetic substances.

The user may rotate the knob 220 by attaching the knob 220 to the knob region of the main body 210 and tuning the knob 220. To be specific, the knob 220 may rotate on the second magnetic substance for attaching the knob 220 to the knob region of the main body 210. In this case, the second magnetic substance may be cylindrical in shape.

The knob 220 may be formed as single body with the second magnetic substance and rotate on the second magnetic substance. Further, the knob 220 may consist of a fixing unit (not shown) for fixing the second magnetic substance and a rotation unit (not shown) for rotating on the fixing unit. In this case, a bearing may be inserted between the fixing unit and the rotation unit such that the rotation unit rotates along an outer circumferential surface of the fixing unit. The structure of the knob 220 will be described below in further detail with reference to FIGS. 5 to 10.

According to another embodiment disclosed herein, the knob 220 may be attached to the main body 210 through an uneven structure. In this case, the knob 220 may be engaged with a cylindrical or conical uneven portion formed on the knob region of the main body 210 and rotate by the user's manipulation. The structure of the knob 220 according to this embodiment will be described below in further detail with reference to FIGS. 11 and 12.

The touch sensor unit 230 senses various user's manipulations inputted through the knob 220 in the manner of coming into contact with the attached knob 220. The touch sensor unit 230 may be formed around the knob region of the main body 210. In this case, in response to the knob 220 being attached, one part of the knob 220 may be touched by the touch sensor unit 230. For example, in response to the knob 220 including a protruding part raised convexly in a certain size at the lower side of the knob 220, the protruding part may touch the touch sensor unit 230.

The touch sensor unit 230 may be arranged so as to surround the knob region in a certain range. To be specific, the touch sensor unit 230 may include a plurality of touch sensors arranged circlewise around the knob region. Accordingly, in response to the knob 220 rotating, a touch position where the protruding part touches the touch sensor unit 230 is changed. That is, the plurality of touch sensors may be arranged circlewise around the knob region so as to sense the touches consecutively along a rotation route of the knob 220 attached to the main body 220. In this case, the touch sensors may operate according to a resistive overlay method, a capacitance method, a Surface Acoustic Wave (SAW) method, an Infrared Rays (IR) method, or an optical method.

The touch sensor unit 230 may sense a touch by an input means other than the knob 220 in a state in which the knob 220 is detached from the main body 210. For example, the touch sensor unit 230 arranged on the knob region exposed as one surface of the main body 210 as the knob 220 is detached from the main body 210 and around the knob region may sense a touch by a user body including a finger and by a sensible material including a touch pen with respect to the knob region of the main body 210.

The control unit 240 controls the components of the induction device 200. To be specific, in response to the knob 220 rotating in the state in which the knob 220 is attached to the knob region, the control unit 240 may determine a degree of rotation of the knob 220 according to a touch position of the knob 220 sensed by the touch sensor unit 230 and adjust a temperature of at least one of the first and second heaters 211, 213 according to the determined result. A controlled heater, that is, a heater to be controlled may be selected at random by the user's manipulation. By way of example, in response to the user selecting a button corresponding to the first heater 211 and rotating the knob 220, the control unit 240 may control the temperature of only the first heater 211. In response to the user selecting a button corresponding to the second heater 213 and rotating the knob 220, the control unit 240 may control the temperature of only the second heater 213. In response to the user selecting a button for controlling both of the first and second heaters 211, 213 and rotating the knob 220 or rotating the knob 220 without selecting any button, the control unit 240 may control the temperatures of both of the first and second heaters 211, 213.

In response to the protruding part being formed at the lower side of the knob 220, the control unit 240 may determine the degree of rotation of the knob 220 according to the touch position of the protruding part touched by the touch sensor unit 230. The degree of rotation is a term for defining how the rotation is performed and include a direction of rotation, a distance of rotation, a speed of rotation, or the like.

In response to the knob 220 rotating in the state in which the knob 220 is attached to the knob region of the main body 210, the control unit 240 may determine the degree of rotation of the knob 220 and a direction of rotation according to an order that the protruding part of the knob 220 touched the plurality of touch sensors arranged circlewise around the knob region and the number of the touched touch sensors.

To be specific, in response to the protruding part of the knob 220 sequentially touching the plurality of touch sensors of the touch sensor unit 230 provided on the main body 210 while the knob 220 is attached to the knob region and rotates, each touch sensor transmits a touch sensing signal to the control unit 240. The control unit 240 may determine the degree of rotation and the direction of rotation of the knob 220 based on the number and locations of the touch sensors that transmitted the touch sensing signals.

By way of example, it is assumed that there are eight touch sensors arranged circlewise around the knob region. In response to the protruding part of the knob touching the touch sensors, each touch sensor transmits the touch sensing signal to the control unit 240. In response to sequentially receiving the touch sensing signal from a first touch sensor located at twelve o'clock, the touch sensing signal from a second touch sensor arranged clockwise, and the touch sensing signal from a third touch sensor arranged at three o'clock, the control unit 240 may determine that the knob 220 rotated 90 degrees clockwise.

The control unit 240 may adjust the temperature of the controlled heater, that is, a heater to be controlled, out of the first and second heaters 211, 213 according to the determined result. For example, it is assumed that a temperature control system is set to have eight temperature levels, and the controlled heater is the first heater 211. In response to the knob 220 rotating 90 degrees clockwise while the first heater 211 is turned off, the control unit 240 turns on the first heater 211 and increase the temperature to Level 2.

In response to an initial touch being sensed in a fifth touch sensor at six o'clock and touches sequentially being sensed counterclockwise to the first touch sensor, the control unit 240 may determine that the knob 220 rotated 180 degrees counterclockwise. In this case, the control unit 240 decreases the temperature of the controlled heater. In response to the knob 220 rotating 180 degrees counterclockwise in a state in which the temperature of the first heater 211 has been increased to Level 2, the control unit 240 turns off the first heater 211 immediately. In response to the knob 220 rotating 45 degrees counterclockwise, the control unit 240 decreases the temperature of the first heater 211 to Level 1.

As described above, the knob 220 is attachable to or detachable from the main body 210, and thus, the touch position where the protruding part is touched by the touch sensor unit 230 may be changed every time the knob 220 is attached or detached. In response to the knob 220 being detached and then attached to the main body 210 again, the control unit 240 determines the degree of rotation based on the first touch position. In other words, in response to the knob 220 touching a seventh touch sensor at nine o'clock, rotating clockwise, and then touching an eighth touch sensor arranged next to the seventh touch sensor, the control unit 240 may turn on the first heater 211 and increase the temperature of the first heater 211 to Level 1.

In the state in which the knob 2220 is detached, the user may adjust the temperature of the first and second heaters 211, 213 by using an input means other than the knob 220. To be specific, the user may touch the touch sensor unit 230 directly using a finger or a touch pen and move the touch position clockwise or counterclockwise. In this case, the control unit 240 may adjust the temperature of the first and second heaters 211, 213 according to the touch position of the input means sensed by the touch sensor unit 230. To be specific, in response to the user touching the touch sensor unit 230 with a hand and moving the hand clockwise or counterclockwise in an arranged direction of the touch sensors while keeping the touch in the state in which the knob 220 is detached from the main body 210, the control unit 240 may determine a moving direction and a moving distance of the sensed touch and adjust the temperatures of the first and second heaters 211, 213.

Further, the control unit 240 may calculate the degree of rotation of the knob 220 according to time and change a change amount of the temperatures of the first and second heaters 211, 213 based on a speed of rotation of the knob 220. To be specific, the control unit 240 may increase or decrease the temperatures of the first and second heaters 211, 213 much more with a higher speed of rotation of the knob 220.

In case of other input means than the knob 220 (for example, a finger, a touch pen, or the like), a dimension or strength of a touch may vary as compared with the touch by the knob 220. Accordingly, the touch sensor unit 230 may result in malfunction due to misrecognition of a touch. According to another embodiment disclosed herein, touch sensitivity of the touch sensor unit 230 may be adjusted according to whether the knob 220 is attached or detached, by considering the aforementioned problem.

In particular, the control unit 240 may adjust the touch sensitivity of the touch sensor unit 230 according to whether the knob 220 is attached to the main body 210. More particularly, the control unit 240 may adjust the touch sensitivity of the touch sensor unit 230 to be first sensitivity in the state in which the knob 220 is attached to the knob region of the main body 210 and adjust the touch sensitivity of the touch sensor unit 230 to be second sensitivity in the state in which the knob 220 is detached from the knob region of the main body 210.

In this case, the control unit 240 may adjust the touch sensitivity of the touch sensor unit 230 more sensitively in response to a touch being performed while the knob 220 is attached and adjust the touch sensitivity more insensitively in response to a touch being performed while the knob 220 is detached, in order to avoid any malfunction by other input means.

The attachment state of the knob 220 may be sensed in various methods.

By way of example, the main body 210 may further include a sensor for sensing the attachment state of the knob 220. To be specific, the main body 210 may further include a hall sensor at one side of the knob region where the knob 220 is attached or detached. The control unit 240 may determine whether the knob 220 is attached or detached by using the hall sensor arranged at one side of the knob region.

The hall sensor may sense a change of a voltage according to a change of an ambient magnetic field and transmit a signal corresponding to the attachment or detachment of the knob 220 to the control unit 240. In other words, in response to the knob 220 approaching the knob region of the main body 210, the hall sensor may transmit a signal corresponding to a sensing result of the magnetic field changed by the first magnetic substance in the main body 210 and the second magnetic substance in the knob 220 to the control unit 240.

The control unit 240 may determine whether the knob 220 is attached or detached by sensing a voltage of the hall sensor changed depending upon a magnetic force around the hall sensor which varies depending upon a distance between the first magnetic substance of the knob 220 and the second magnetic substance provided at the lower side of the knob region of the main body 210.

In the above-described embodiments, the user may select a controlled heater by using a separate button, but not limited thereto. That is, according to another embodiment disclosed herein, the knob may be realized so as to tilt by a user's push manipulation such that the user may select a controlled heater by tilting the knob and then adjust a temperature of the selected heater by rotating the knob. In this case, the main body may further include a heater selection unit which may touch the knob in response to the knob tilting. The heater selection unit may be realized as another touch sensor.

The control unit 240 may select any one of the first and second heaters 211, 213 as the controlled heater according to a touch of the heater selection unit (not shown) provided outside around the touch sensor unit 230. To be specific, in response to the knob 220 attached to the knob region tilting in a certain side and touching the heater selection unit (not shown), the control unit 240 may select a heater corresponding to a pushed direction of the knob 220 as the controlled heater. Further, in response to the heater selection unit (not shown) being touched by other input means, the control unit 240 may select a heater corresponding to the touch position of the input means as the controlled heater. A detailed description for the structure of the induction device according to this embodiment will be provided below with reference to the accompanying drawing.

As described above, the induction device according to an embodiment disclosed herein may perform an input for adjusting a temperature of a heater by using a knob or adjust the temperature of the heater by using the user's hand or other input means although the knob is removed.

Figure 3:
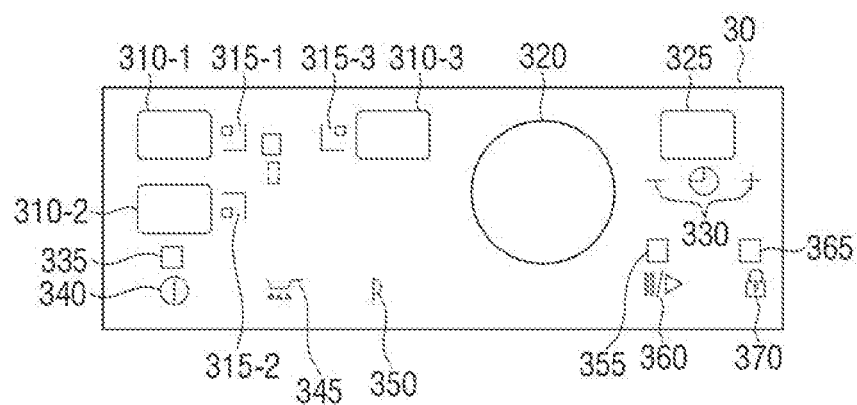
FIG. 3 is a diagram illustrating a control input device of FIG. 1.

FIG. 3 is a diagram illustrating a control input device of FIG. 1.

Referring to FIG. 3, the control input device 30 includes temperature display units 310-1, 310-2, 310-3, heater selection units 315-1, 315-2, 315-3, a knob 320, a timer display unit 325, a timer adjustment unit 330, a power display unit 335, a power unit 340, a simmering setting unit 345, a power boost unit 350, a start/pause display unit 355, a start/pause input unit 360, a locking display unit 365, and a locking setting unit 370.

The temperature display units 310-1, 310-2, 310-3 display a heating intensity of a heater in operation. To be specific, the temperature display units 310-1, 310-2, 310-3 may display a number indicating the heating intensity of the heater. Further, the temperature display units 310-1, 310-2, 310-3 may display a temperature of a burner sensed by a temperature sensor in Fahrenheit or in Celsius. The temperature display units 310-1, 310-2, 310-3 may display that a heat remains on a burner corresponding to each of the temperature display units 310-1, 310-2, 310-3 after the heating of the heater ends.

Each of the temperature display units 310-1, 310-2, 310-3 consists of two 7-segment Light Emitting Diode (LED) displays to display single-digit number or double-digit numbers. Further, the temperature display units 310-1, 310-2, 310-3 may be realized as any one of a Liquid Crystal Display (LCD), a Thin Film Transistor-Liquid Crystal Display (TFT-LCD), and an Organic Light-Emitting Diode (OLED) display.

The heater selection units 315-1, 315-2, 315-3 may receive an input for selecting a heater to be heated from among a plurality of heaters 20-1, 20-2, 20-3. To be specific, each of the heater selection units 315-1, 315-2, 315-3 may correspond to each of the plurality of heaters 20-1, 20-2, 20-3. The heater selection units 315-1, 315-2, 315-3 may sense an input for touching the heater selection units 315-1, 315-2, 315-3 and select a heater to be heated from among the plurality of heaters 20-1, 20-2, 20-3.

As illustrated in FIG. 3, the heater selection units 315-1, 315-2, 315-3 are arranged on a left upper region of the control input device 30 so as to correspond to the positions of the burners of the cooktops. Accordingly, the user may select the plurality of heaters 20-1, 20-2, 20-3 easily.

In this case, the burner refers to a region where the cookware is placed on an upper surface of a main body in a region where the plurality of heaters 20-1, 20-2, 20-3 are located.

The knob 320 may receive a user's manipulation for adjusting the temperatures of the heaters. To be specific, the knob 320 may by attached to the knob region provided on one surface of the control input device 30 and receive a user's manipulation of rotating the knob 320.

The knob 320 may be arranged to be adjacent to the left upper region where the temperature display units 310-1, 310-2, 310-3 and the heater selection units 315-1, 315-2, 315-3 are located on the control input device 30 such that the user may manipulate the knob 320 easily checking the heating intensity of the heaters.

The timer display unit 325 may display a heating time of the heater set by the user. To be specific, the timer display unit 325 may display a setting time in at least one of an hour (hr) unit, a minute (min) unit, and a second (sec) unit. For example, the timer display unit 325 may display '9:99' indicating a setting time of 9 hours and 99 minutes or '99:99' indicating the setting time of 99 minutes and 99 seconds. The timer display unit 325 may display a time in such a way that the number indicating the time decreases as the time elapses. In response to the setting time being finished, the timer display unit 325 may display 'END' indicating the completion of heating.

The timer display unit 325 may be realized as any one of the LED, LCD, TFT-LCD, and OLED displays.

The timer adjustment unit 330 may receive a command for inputting a time according to a timer function. To be specific, the timer adjustment unit 330 may receive an input for increasing or decreasing the number displayed in the timer display unit 325. FIG. 3 shows that the timer adjustment unit 330 receives only touch inputs of '−' and '+,' but in the implementation, the timer adjustment unit 330 may be configured to receive the touch inputs corresponding to the numbers ranging from 0 to 9.

In this case, the timer function may operate as only a function of turning off a certain heater so as not to heat the cookware any more in response to a predetermined time elapsing or informing the user of the elapse of the predetermined time. In the latter case, the timer function may be realized so as to generate a particular notification sound in response to the elapse of the predetermined time.

The power display unit 335 may display a power supply state of the induction device 90. To be specific, the power display unit 335 may include a light-emitting element that emits light in response to the power being supplied to the induction device 90.

The power unit 340 may receive an input for powering on or powering off the induction device 90. To be specific, the power unit 340 may receive a touch input for powering on the induction device 90 in a state in which the induction device 90 is powered off and receive a touch input for powering off the induction device 90 in a state in which the induction device 90 is powered on. In this case, the induction device 90 may be realized so as to convert an power-on/off state in response to a touch input for powering on or powering off the induction device 90 being maintained over a predetermined time with respect to the power unit 340.

The simmering setting unit 345 may receive an input for setting a simmering function. To be specific, the simmering setting unit 345 may receive a touch input for setting or cancelling the simmering function.

In this case, 'simmering' refers to a heating intensity which may be used to heat a large amount of food, such as, stew, soup, or the like, over low heat and keep the food warm.

The power boost unit 350 may receive an input for setting a power boost function. To be specific, the power boost unit 350 may receive an input for setting or cancelling the power boost function.

In this case, 'power boost' refers to a function of applying a heating power greater than a maximum heating power of a heater that may be applied through the knob 220. The power boost function may be used to boil water in a short time. The power boost function may include a function of maintaining the heating power only for a certain period of time during the power boost operation in order to protect the inner components of the induction device 90.

The start/pause display unit 355 may display a state where a selected heater heats the food or the cookware with a preset heating intensity and a state where the heating is paused.

The start/pause display unit 355 may include a light-emitting element for displaying the states.

The start/pause input unit 360 may receive an input for instructing the selected heater to heat the food or the cookware with a preset heating intensity. To be specific, the start/pause input unit 360 may receive a user's touch input for instructing the selected heater to start heating with the preset heating intensity.

Further, the start/pause input unit 360 may receive an input for pausing the heating of the heater while the heater applies the heat. To be specific, the start/pause input unit 360 may receive a touch input for instructing to pause the operation of the heater while the heater applies the heat.

For example, the user may select the third heater selection unit 315-3 from among the plurality of heater selection units 315-1, 315-2, 315-3 and rotate the knob 320 to display a number corresponding to a desired heating intensity for the selected heater in the third temperature display unit 310-3. Subsequently, the user may touch the start/pause display unit 355 to input a command for instructing the selected heater to apply the heat with the preset heating intensity. The start/pause display unit 355 may emit the light indicating that the heater heats the cookware.

In response to the user touching the start/pause display unit 355 while the selected heater heats the cookware, the operation of the selected heater stops. In response to the interruption of the operation of the heater, the light of the start/pause display unit 355 may be turned off.

The locking display unit 365 may display a setting state of a locking function. To be specific, in response to the locking function being set, a light-emitting element of the locking display unit 365 may emit the light. By contrast, in response to the locking function being released, the light-emitting element of the lock display unit 365 may be turned off.

The locking function is to prevent fire or accidents due to the heating caused by an inadvertent operation of a heater. In response to the locking function being set, an input for operating the heater is interrupted.

The locking setting unit 370 may receive an input for setting the locking function. To be specific, the locking setting unit 370 may receive a touch input for setting the locking function. Further, the locking function may be set to be executed in response to the locking setting unit 370 being touched over a predetermined time.

Further, the locking setting unit 370 may receive an input for releasing the locking state while the locking function is executed. To be specific, the locking setting unit 370 may receive a touch input for cancelling the locking function while the locking function is executed.

Figure 4:
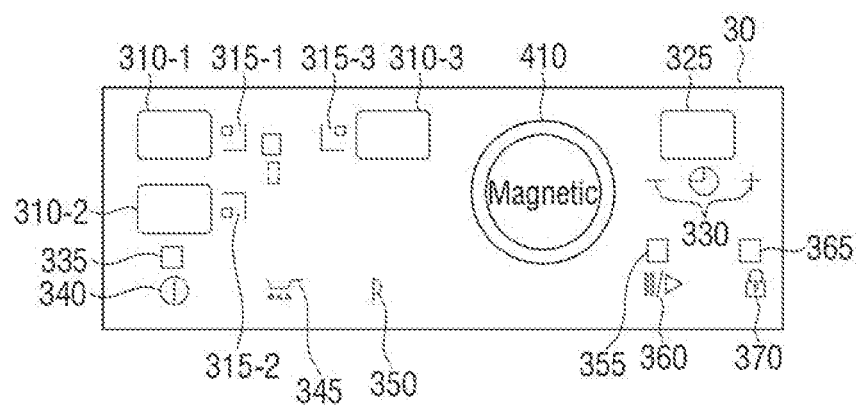
FIG. 4 is a diagram provided to describe an example where a knob of the control input device of FIG. 3 is removed.

FIG. 4 is a diagram provided to describe an example where a knob of the control input device of FIG. 3 is removed.

Referring to FIG. 4, the control input device 30 includes temperature display units 310-1, 310-2, 310-3, heater selection units 315-1, 315-2, 315-3, a knob region 410, a timer display unit 325, a timer adjustment unit 330, a power display unit 335, a power unit 340, a simmering setting unit 345, a power boost unit 350, a start/pause display unit 355, a start/pause input unit 360, a locking display unit 365, and a locking setting unit 370. The functions and operations of the components except for the knob region 410 of FIG. 4 are the same as the functions and operations of the components of FIG. 3, and thus, a repeated description will be omitted.

The knob region 410 refers to a position where the knob is attached or detached. To be specific, the knob region 410 may be provided on a position where the knob is attached or detached, on a surface of the control input device 30.

The knob region 410 may include a permanent magnet for the knob being attached at a lower side thereof. Further, the knob region 410 may display that the knob region is a region to which the knob is attached.

The knob region may be located to be adjacent to the temperature display units 310 and the heater selection units 315.

FIG. 1 illustrates a structure where a plurality of cooktops and one control input device are combined, and FIGS. 2 to 4 are provided to describe structures and operations for controlling temperatures of the respective cooktops by using one knob, but not limited thereto. That is, in response to the plurality of cooktops being provided, the cooktops may have one knob region, respectively. Accordingly, the user may attach a knob to the knob region of each cooktop to adjust the temperature the cooktop. In this case, the heater selection units may be omitted.

The user may turn off a state where the knob is attached to the knob region or detach the knob from the knob region and store the knob in a separate place when not in use. In this case, the induction device may further provide a storage region for storing the knob on a lateral surface, a front surface, or in a lower part of the main body. In response to the knob including a magnetic substance, another magnetic substance having the opposite polarity may be provided in the storage region such that the knob is stored with being attached to the main body.

In the above-described example, the control unit 240 turns on a corresponding heater and adjust a temperature of the heater in response to the knob rotating in the state in which the knob is attached, but not limited thereto. That is, in response to sensing the attachment of the knob, the control unit 240 may turn on a corresponding heater immediately and await a user's next input.

As described above, the knob may be realized in diverse forms. Hereinafter, exemplary embodiments of the knob will be provided in greater detail with reference to the accompanying drawings.

FIGS. 5 to 8 are illustrating structures of a knob according to the first embodiment disclosed herein.

Figure 5:
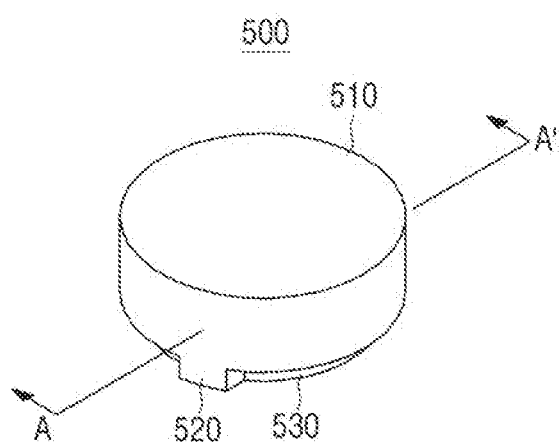
FIGS. 5 to 8 are illustrating structures of a knob according to the first embodiment disclosed herein.

FIG. 5 is a perspective view of a knob 500. Referring to FIG. 5, the knob 500 includes a handle member 510, a protruding part 520, and a second magnetic substance 530.

The handle member 510 may be formed such that the user may rotate the knob 500 with a hand. To be specific, the handle member 510 may be cylindrical in shape.

The handle member 510 may be connected to the protruding part 520. Further, the handle member 510 may be made of a conductive metal material for changing the capacitance by touching a touch sensor in response to a user's manipulation using the handle member 510.

The protruding part 520 may protrude downwardly from the handle member 510 to a lower flat surface of the knob 500 so as to touch the touch sensors arranged around the knob region.

The second magnetic substance 530 may be formed at a lower side of the handle member 510 and function as a rotation axis. The second magnetic substance 530 may have the opposite polarity with respect to the first magnetic substance arranged at the lower side of the knob region and be attached to the knob region by the gravitation between the first magnetic substance and the second magnetic substance 530.

The second magnetic substance 530 may be cylindrical in shape such that the handle member 510 may rotate.

Figure 6:
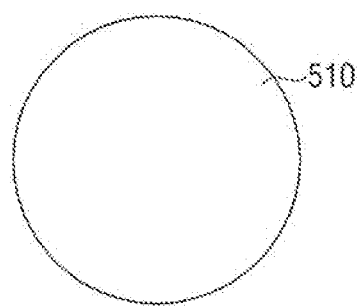

FIG. 6 is a top view of the knob 500. Referring to FIG. 6, an upper surface of the handle member 510 may be a circular flat surface.

Figure 7:
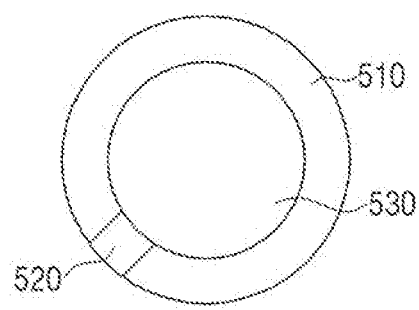

FIG. 7 is a bottom view of the knob 500. Referring to FIG. 7, the handle member 510 may have a broader radius than the second magnetic substance 530. The circular second magnetic substance 530 may have a narrower radius than the handle member 510 and may be located on a center inside the handle member 510.

The protruding part 520 may protrude downwardly on one region corresponding to an edge of the handle member 510 located outside the second magnetic substance 530.

Figure 8:
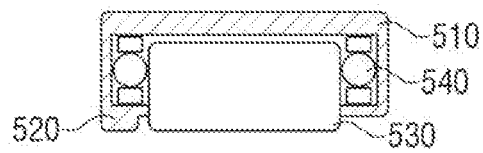

FIG. 8 is a sectional view taken along A-A' of the knob 500 of FIG. 5. Referring to FIG. 8, the handle member 510 may surround the inner bearing 540 and one part 530 of the second magnetic substance from outside. The protruding part 520 may extend downwardly from the handle member 510.

One part of the second magnetic substance 530 may be inserted in the handle member 510, and another part may protrude to the outside so as to be attached to the knob region.

The bearing 540 may be located between the handle member 510 and the second magnetic substance 530 and help the handle member 510 to rotate smoothly. To be specific, the bearing 540 may be a plurality of spheres arranged along the outer circumferential surface of the second magnetic substance 530 inside the handle member 510.

In FIGS. 5 to 8, the handle member 510 is cylindrical in shape, but the handle member 510 may be polygonal in shape to enable the user to grab and rotate the handle member 510 easily. The handle member 510 may further have a bar-shaped protruding part at an upper side thereof and have a protrusion formed along a lateral surface thereof.

In addition, in FIGS. 5 to 8, an entire cylinder located on the center of the knob 500 is the second magnetic substance 530. However, a magnetic material for a magnetic moment may be formed partially from the center of the knob 500 towards the lower side, and an upper side of the central cylinder may be made of a different kind of material durable to the rotation of the bearing.

Further, in FIGS. 5 to 8, the protruding part 520 may be in the shape of squared rectangular parallelepiped, but the protruding part 520 may have a round-curved bottom surface such that the knob 500 may rotate smoothly on a floor.

As described above, the knob according to the first embodiment may be attached/detached to/from the main body and may be touched by the touch sensors of the main body consecutively although the knob rotates in the state in which the knob is attached to the main body.

Figure 9:
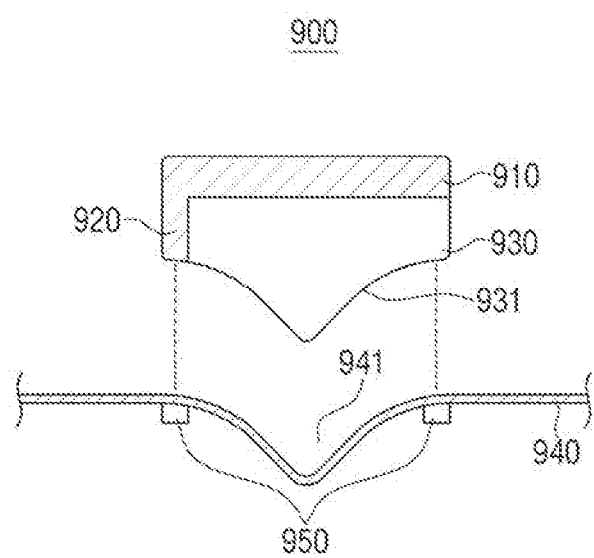
FIG. 9 is a diagram illustrating structures of a knob and a knob region according to the second embodiment disclosed herein.

FIG. 9 is a diagram illustrating structures of a knob and a knob region according to the second embodiment disclosed herein.

Referring to FIG. 9, a knob 900 includes a handle member 910, a protruding part 920, and a cowl 930. The knob region includes a glass panel 940 and a touch sensor unit 950.

The handle member 910 may be formed so as to enable the user to rotate the knob 900 with a hand. The handle member 910 is the same as the handle member 510 of FIG. 5, and thus, a repeated description for the specific shape and functions will be omitted.

The protruding part 920 may protrude downwardly from the handle member 910 of the knob 900 so as to touch the touch sensors arranged around the knob reaction. To be specific, the protruding part 920 may be formed on a part of an edge region where a lower surface of the knob 900 is in contact with a touch position in the state in which the knob is attached to the knob region. The protruding part 920 may be inserted in a groove formed on a lateral surface of the cowl 930, and a lower surface of the protruding part 920 touching the touch sensors may be exposed to the outside.

The cowl 930 may be in the shape of a cone that protrudes towards the lower side of the knob 900. The knob region may be formed in a dented structure 941 dented concavely so as to correspond to the cowl 930.

Accordingly, in response to the user placing the knob 900 on the dented structure 941 of the knob region, the cowl 930 is inserted in the dented structure 941 starting with an apex 931 of the cowl 930 and engaged with the knob region. The user may rotate the knob 900 to adjust the temperature of a heater in the state in which the cowl 930 is engaged with the dented structure 941.

The cowl 930 may include a material with a lesser frictional force so as to rotate easily in the state in which the cowl 930 faces and is in contact with the knob region.

The glass panel 940 covering the knob region may be formed in a snap-fit engagement structure with respect to the cowl 930 of the knob 900. To be specific, the glass panel 940 of the knob region may be dented in shape so as to correspond to the cowl 930.

The touch sensor unit 950 may be arranged around the knob region to sense a touch position of the protruding part 920 of the knob 900. To be specific, the touch sensor unit 950 may be arranged on a route where the protruding part of the knob 900 passes by the glass panel 940 during the rotation of the knob 900. Further, the touch sensor unit 950 may sense the touch positions touched by the protruding part 920 while the knob 900 rotates.

In FIG. 9, the protruding part 920 is formed at the side of the cowl 930, but the protruding part 920 may be formed around the apex 931 of the cowl 930. In this case, the touch sensor unit 950 may be formed on a lateral surface in the dented structure of the knob region.

Figure 10:
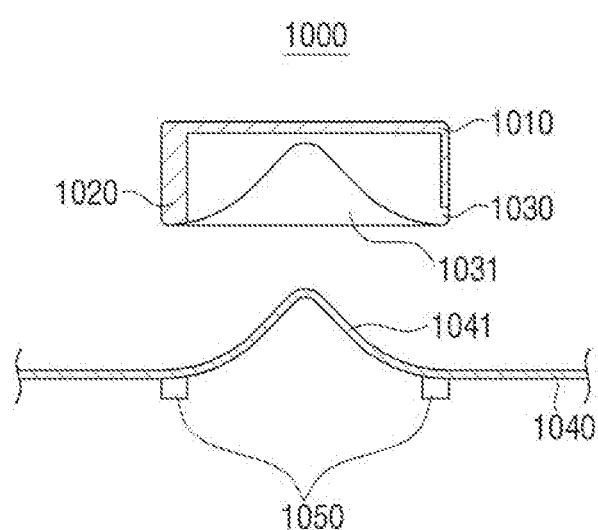
FIG. 10 is a diagram illustrating structures of a knob and a knob region according to the second embodiment disclosed herein.

FIG. 10 is a diagram illustrating structures of a knob and a knob region according to the second embodiment disclosed herein.

Referring to FIG. 10, a knob 1000 includes a handle member 1010, a protruding part 1020, and an engagement member 1030. The engagement member 1030 may have a dented structure 1031 dented concavely.

The knob region may have a raised structure 1041 rose convexly from the upper surface of the main body and a touch sensor unit 1050 arranged around the raised structure 1041. The raised structure 1041 may be covered with the glass panel 1040.

The handle member 1010 may be formed so as to enable the user to rotate the knob 1000 with a hand. The specific functions and structure of the handle member 1010 are the same as those of the handle member 910 of FIG. 9, and thus, a repeated description will be omitted.

The protruding part 1020 may protrude downwardly from the handle member 1010 to a lower flat surface of the knob 1000 so as to touch the touch sensors arranged around the knob region. The functions and structure of the protruding part 1020 are the same as those of the protruding part 1020 of FIG. 9, and thus, a repeated description will be omitted.

The engagement member 1030 may be engaged with the knob region. To be specific, a lower surface of the engagement member 1030 may be formed in a snap-fit engagement structure with respect to a conical structure formed on the surface of the knob region. That is, the lower surface of the engagement member 1030 may be formed in a structure dented conically so as to correspond to the uneven structure on the surface of the knob region.

The glass panel 1040 of the knob region may have an uneven portion that protrudes conically. To be specific, the glass panel 1040 of the knob region may have a cone-shaped uneven portion where a radius of a circle is reduced to the top, and a top point at the highest position may correspond to the rotation axis of the knob 1000.

The touch sensor unit 1050 may be arranged around the knob region and sense a touch position touched by the protruding part 1020 of the knob 1000. The functions and structure of the touch sensor unit 1050 are the same as those of the touch sensor unit 950 of FIG. 9, and thus, a repeated description will be omitted.

In FIG. 10, the glass panel 1040 in a certain thickness is formed so as to protrude from the inside of the main body to the outside, but in the implementation, a conical member may be attached to a flat glass substrate.

Further, in FIG. 10, the protruding part 1020 is formed at the side of the engagement member 1030, but the protruding part 1020 may be formed on a lateral surface in the dented structure of the engagement member 1030. In this case, in the knob region, the touch sensor unit 1050 may be formed on a lateral surface of the raised structure.

In FIGS. 9 and 10, the knob region is covered with a glass panel, but not limited thereto. The knob region may be covered with a heat-resisting film or panel.

Figure 11:
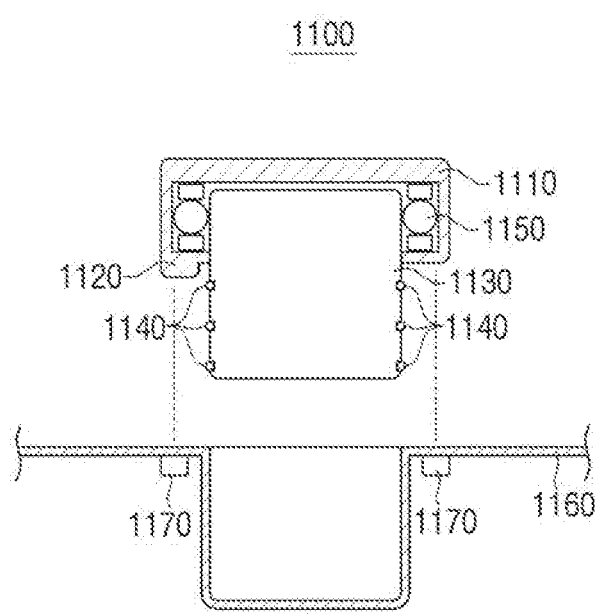
FIG. 11 is a diagram illustrating structures of a knob and a knob region according to the third embodiment disclosed herein.

FIG. 11 is a diagram illustrating structures of a knob and a knob region according to the third embodiment disclosed herein.

Referring to FIG. 11, a knob 1100 includes a handle member 1110, a protruding part 1120, an engagement unit 1130, a plurality of O-rings 1140, and a bearing.

The handle member 1110 may be formed so as to enable the user to rotate the knob 1100 with a hand. The specific functions and structure of the handle member 1110 are the same as those of the handle member 510 of FIG. 5, and thus, a repeated description will be omitted.

The protruding part 1120 may protrude downwardly from the handle member 1110 of the knob 1100 so as to touch the touch sensors arranged around the knob region. To be specific, the protruding part 1120 may be formed on a some portion at a lower side of an edge region of the handle member 1110, and a radius of the portion may be broader than a radius of the engagement unit 1130.

The engagement unit 1130 is inserted in the knob region to form a rotation axis of the knob 1100. To be specific, the engagement unit 1130 may be cylindrical in shape. The plurality of O-rings 1140 may be arranged along an outer circumferential surface of the engagement unit 1130. In response to the knob 1100 being attached to the knob region, the plurality of O-rings 1140 may fix the engagement unit 1130 and a lateral surface in a dented structure of the knob region by increasing the frictional force.

In FIG. 11, three O-rings 1140 are provided, but in the implementation, one, two, or four or more O-rings may be included. Further, the O-ring may be realized as a wide band-shaped O-ring.

The bearing 1150 may be located between the handle member 1110 and the engagement unit 1130 and help the handle member 1110 to rotate smoothly. The functions and structure of the bearing are the same as those of the bearing 550 of FIG. 5, and thus, a repeated description will be omitted.

Figure 12:
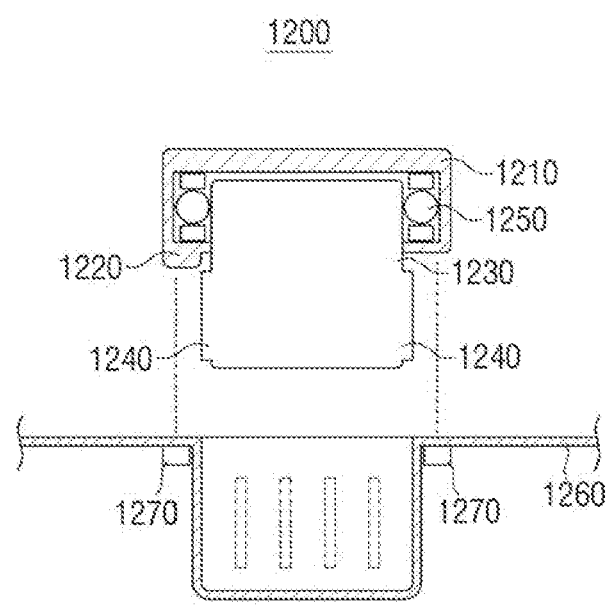
FIG. 12 is a diagram illustrating structures of a knob and a knob region according to the fourth embodiment disclosed herein.

FIG. 12 is a diagram illustrating structures of a knob and a knob region according to the fourth embodiment disclosed herein.

Referring to FIG. 12, a knob 1200 includes a handle member 1210, a protruding part 1220, an engagement unit 1230, and a bearing 1250.

The handle member 1210 may be formed so as to enable the user to rotate the knob 1200 with a hand. The specific functions and structure of the handle member 1210 are the same as those of the handle member 1110 of FIG. 11, and thus, a repeated description will be omitted.

The protruding part 1220 may protrude downwardly from the handle member 1210 of the knob 1200 so as touch the touch sensors arranged around the knob region. The functions and structure of the protruding part 1220 are the same as those of the protruding part 1120 of FIG. 11, and thus, a repeated description will be omitted.

The engagement unit 1230 may form an axis on which the handle member 1210 of the knob 1200 rotates. The functions and structure of the engagement unit 1230 are the same as those of the engagement unit 1130 of FIG. 11, and thus, a repeated description will be omitted.

The engagement unit 1230 may have at least one protruding part 1240 extending lengthwise on a lateral surface thereof.

The protruding part 1240 may form a protruding portion on the engagement unit 1230. To be specific, the protruding part 1240 may be formed at a lower side where the engagement unit 1230 is inserted to be attached to the knob region. The protruding part 1240 may be inserted in a groove on the knob region and formed so as to correspond to a vertical axis direction to support the rotation of the handle member 1210.

The number of the protruding part 1240 formed on the engagement unit 1230 is not limited to the example of FIG. 12. The protruding part 1240 may have different widths. Further, the protruding part 1240 is not limited to a protruding part corresponding to the vertical axis direction and may be formed as a groove 1240 in a diagonal direction.

The bearing 1250 may be located between the handle member 1210 and the engagement unit 1230 and help the handle member 1210 to rotate smoothly. The functions and structure of the bearing are the same as those of the bearing 1150 of FIG. 11, and thus, a repeated description will be omitted.

Figure 13:
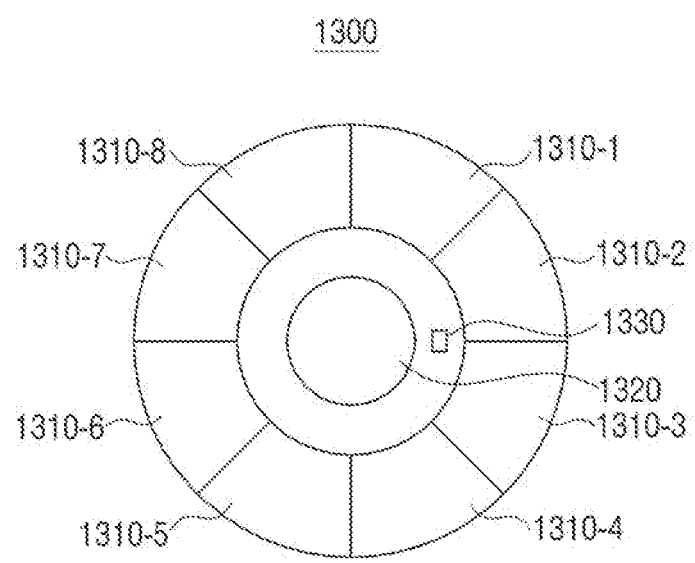
FIGS. 13 and 14 are diagrams illustrating a knob region of a main body according to the first embodiment disclosed herein.
Figure 14:
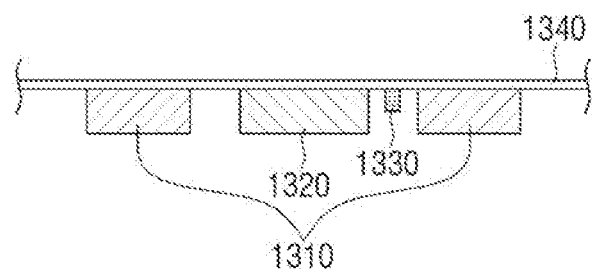

FIGS. 13 and 14 are diagrams illustrating a knob region of a main body according to the first embodiment disclosed herein.

FIG. 13 is a top view of a knob region 1300. Referring to FIG. 13, the knob region 1300 includes a plurality of touch sensors 1310-1, 1310-2, 1310-3, 1310-4, 1310-5, 1310-6, 1310-7, 1310-8, a first magnetic substance 1320, and a hall sensor 1330.

The plurality of touch sensors 1310-1, 1310-2, 1310-3, 1310-4, 1310-5, 1310-6, 1310-7, 1310-8 sense a touch. To be specific, the plurality of touch sensors 1310-1, 1310-2, 1310-3, 1310-4, 1310-5, 1310-6, 1310-7, 1310-8 may sense a touch by a protruding part of the knob. Further, the plurality of touch sensors 1310-1, 1310-2, 1310-3, 1310-4, 1310-5, 1310-6, 1310-7, 1310-8 may sense a touch by other input means.

The plurality of touch sensors 1310-1, 1310-2, 1310-3, 1310-4, 1310-5, 1310-6, 1310-7, 1310-8 may be arranged in a region where a concentric circle is divided in the same angle. By way of example, eight touch sensor 1310-1, 1310-2, 1310-3, 1310-4, 1310-5, 1310-6, 1310-7, 1310-8 may be arranged in a region where a concentric circle is divided to eight even parts.

The first magnetic substance 1320 may form the gravitation with a second magnetic substance of the knob such that the knob is attached or detached. To be specific, the first magnetic substance 1320 may be arranged at a lower side of the knob region by placing the polarity opposite to the polarity of an attached surface of the second magnetic substance of the knob as an upper surface.

The hall sensor 1330 may sense a magnetic field of the second magnetic substance of the knob, changed in response to the knob being attached to the knob region. To be specific, the hall sensor 1330 may sense that a magnetic field by the first magnetic substance 1320 is changed by the approach of the second magnetic substance based on a changed voltage.

In FIG. 13, the hall sensor 1330 is located between the first magnetic substance 1320 and the plurality of touch sensors 1310-1, 1310-2, 1310-3, 1310-4, 1310-5, 1310-6, 1310-7, 1310-8. However, the hall sensor 1330 may be located at a different position where a change of a magnetic field around the knob region may be sensed significantly.

In the embodiment of FIG. 13, the attachment state of the knob is sensed by the hall sensor in the knob region. However, when the touch sensitivity is adjusted automatically through software, the knob region may do not include a hall sensor.

Further, In FIG. 13, eight touch sensors 1310-1, 1310-2, 1310-3, 1310-4, 1310-5, 1310-6, 1310-7, 1310-8 are provided, but in the implementation, nine or more or seven or less touch sensors may be provided in one concentric circle in order to increase or decrease the adjustment levels with respect to a temperature of a heater according to a certain distance of rotation.

In addition, in FIG. 13, each of the plurality of touch sensors 1310-1, 1310-2, 1310-3, 1310-4, 1310-5, 1310-6, 1310-7, 1310-8 senses a touch with respect to the touch sensor itself, but in the implementation, an array-type touch sensor may be installed on a knob region 1300 to sense the touches performed along a certain trace.

FIG. 14 is a side view of the knob region according to the first embodiment disclosed herein.

Referring to FIG. 14, the knob region 1300 includes the touch sensors 1310, the first magnetic substance 1320, the hall sensor 1330, and a glass panel 1340.

As illustrated in FIG. 14, the touch sensors 1310 may be provided in an attached manner on a lower surface of the glass panel 1340 forming an appearance to sense a touch of a protruding part or a touch of other input means, such as, a user's hand.

The first magnetic substance 1320 may be provided in the attached manner on the lower surface of the glass panel 1340 to transmit the gravitation between the first magnetic substance 1320 and the second magnetic substance of the knob sufficiently.

The hall sensor 1330 may be arranged on a line of magnetic force adjacent to the first magnetic substance 1320 to easily sense a change of a magnetic field by an approach of the second magnetic substance to the first magnetic substance 1320.

Figure 15:
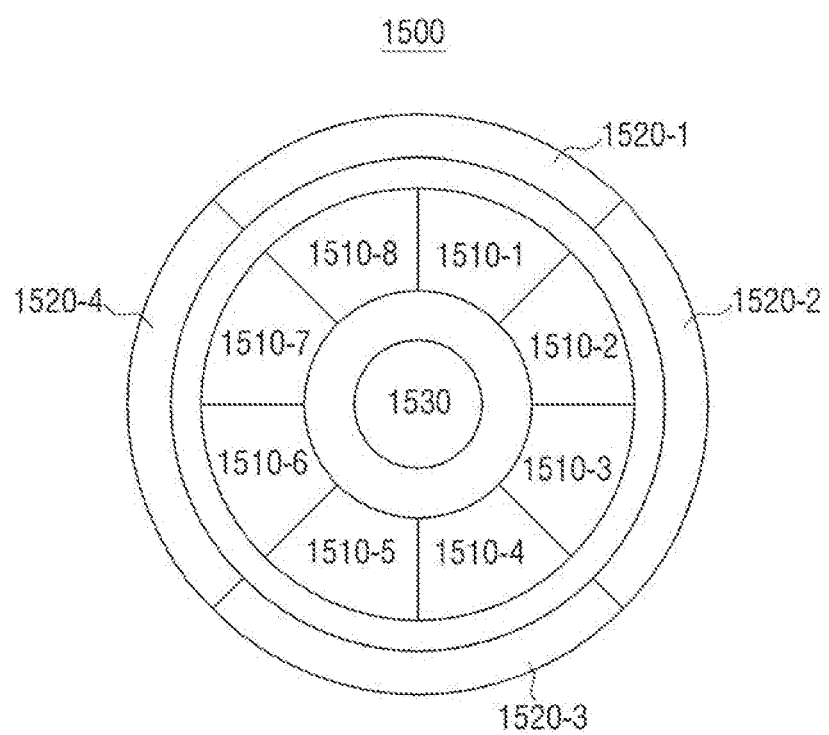
FIG. 15 is a top view of a knob region according to the second embodiment disclosed herein.

FIG. 15 is a top view of a knob region according to the second embodiment disclosed herein.

Referring to FIG. 15, a knob region 1500 includes a plurality of touch sensors 1510-1, 1510-2, 1510-3, 1510-4, 1510-5, 1510-6, 1510-7, 1510-8, a plurality of heater-selection touch sensors 1520-1, 1520-2, 1520-3, 1520-4, and a first magnetic substance 1530.

The plurality of touch sensors 1510-1, 1510-2, 1510-3, 1510-4, 1510-5, 1510-6, 1510-7, 1510-8 sense a touch. The functions and structure of the plurality of touch sensors 1510-1, 1510-2, 1510-3, 1510-4, 1510-5, 1510-6, 1510-7, 1510-8 are the same as those of the plurality of touch sensors 1310-1, 1310-2, 1310-3, 1310-4, 1310-5, 1310-6, 1310-7, 1310-8 of FIG. 10, and thus, a repeated description will be omitted.

The plurality of heater-selection touch sensors 1520-1, 1520-2, 1520-3, 1520-4 may sense a touch for selecting any one of the plurality of heaters. To be specific, each of the plurality of heater-selection touch sensors 1520-1, 1520-2, 1520-3, 1520-4 may correspond to any one of the plurality of heaters.

The plurality of heater-selection touch sensors 1520-1, 1520-2, 1520-3, 1520-4 may be arranged outside around the plurality of touch sensors 1510-1, 1510-2, 1510-3, 1510-4, 1510-5, 1510-6, 1510-7, 1510-8. For example, the plurality of heater-selection touch sensors 1520-1, 1520-2, 1520-3, 1520-4 may be arranged in a region where a concentric circle having a broader radius than a concentric circle of the plurality of touch sensors 1510-1, 1510-2, 1510-3, 1510-4, 1510-5, 1510-6, 1510-7, 1510-8 is divided evenly by the number of the plurality of touch sensors.

In FIG. 15, four heater-selection touch sensors 1520-1, 1520-2, 1520-3, 1520-4 are provided, but in the implementation, three or less or five or more heater-selection touch sensors may be provided so as to correspond to the number of heaters.

The first magnetic substance 1520 may form the gravitation with the second magnetic substance of the knob such that the knob is attached or detached. The functions and structure of the first magnetic substance 1520 are the same as those of the first magnetic substance 1320 of FIG. 10, and thus, a repeated description will be omitted.

Figure 16:
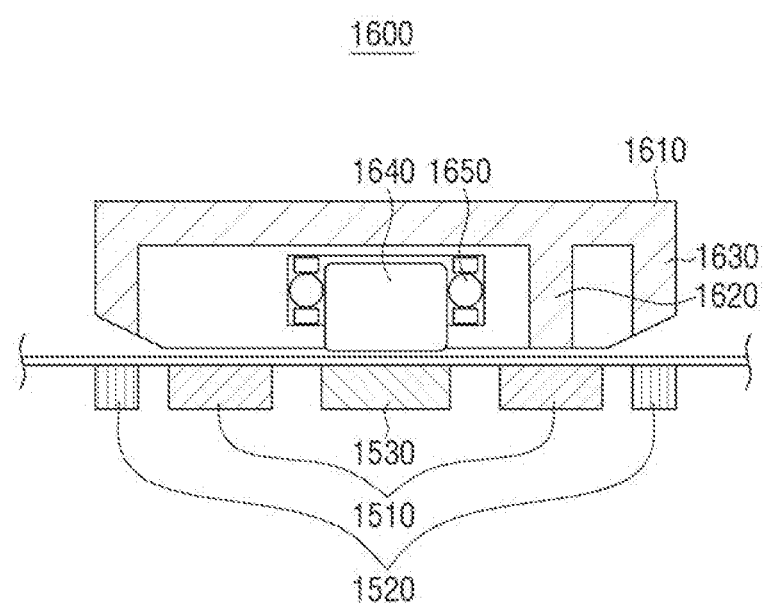
FIGS. 16 and 17 are sectional views of a knob according to the fifth embodiment disclosed herein and the knob region of FIG. 15.
Figure 17:
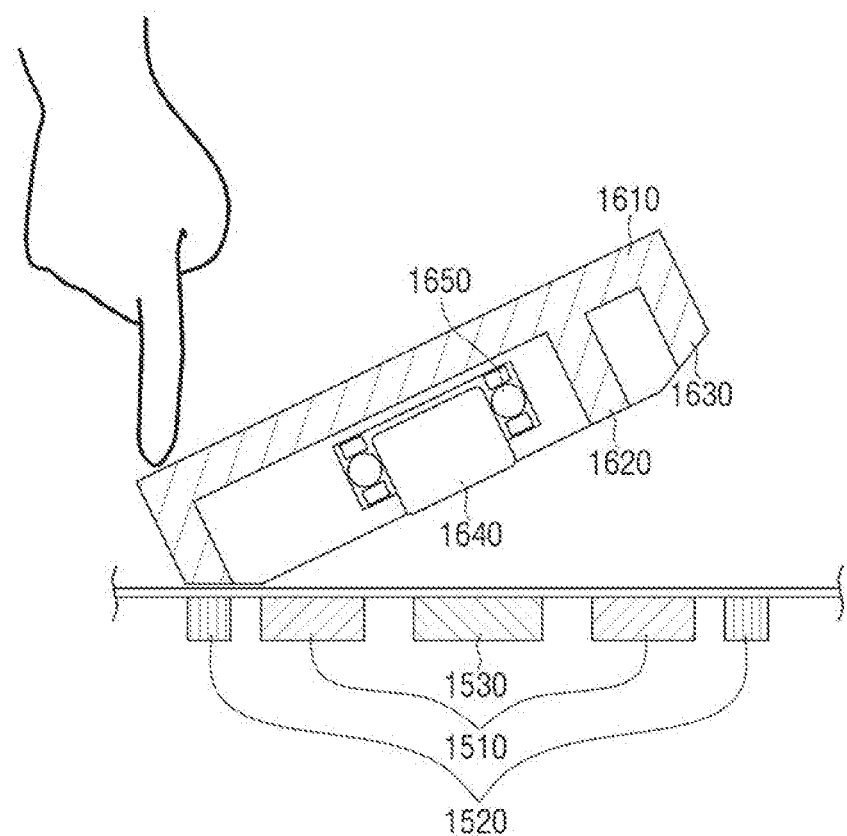

FIGS. 16 and 17 are sectional views of a knob according to the fifth embodiment disclosed herein and the knob region of FIG. 15.

FIG. 16 is a sectional view provided to describe an example of adjusting heating intensity of a heater by using a touch sensor.

Referring to FIG. 16, a knob 1900 includes a handle member 1910, a first protruding part 1920, a second protruding part 1930, a second magnetic substance 1940, and a bearing 1950.

The handle member 1910 may be formed so as to enable the user to rotate the knob 1900 with a hand. To be specific, the handle member 1910 may be cylindrical in shape, but not limited thereto.

The handle member 1910 may be connected to the first protruding part 1920 and the second protruding part 1930. The handle member 1910 may be made of a conductive metal material for changing the capacitance by touching a touch sensor or a heater-selection touch sensor in response to a user's manipulation using the handle member 1910.

The first protruding part 1920 may protrude downwardly from the handle member 1910 to a lower flat surface of the knob 1900 so as to touch at least one of the plurality of touch sensors arranged around the knob region.

The second protruding part 1930 may protrude downwardly from the handle member 1910 in an edge region having a broader radius than the first protruding part 1920 so as to touch at least one of the plurality of heater-selection touch sensors which are additionally provided outside around the touch sensors.

The second magnetic substance 530 may be a rotation axis of the handle member 510 of the knob 500. Further, the second magnetic substance 530 may have the opposite polarity with respect to the first magnetic substance arranged at the lower side of the knob region and be attached to the knob region by the gravitation between the first magnetic substance and the second magnetic substance 530.

The second magnetic substance 1940 may be in the shape of a cylinder on which the handle member 1910 rotates.

The bearing 1950 may be inserted between an outer circumferential surface of the second magnetic substance and an inner circumferential surface of the handle member 1910 covering the second magnetic substance so as to help the rotation of the handle member 1910.

In a state in which the knob 1900 is placed on a flat surface properly, the first protruding part 1920 touches the touch sensor 1510, and the second protruding part 1930 shorter than the first protruding part 1920 does not reach the touch sensor 1520, and thus, only the heating intensity of a heater may be adjusted.

FIG. 17 is a view provided to described an example of a manipulation for touching a heater-selection touch sensor.

Referring to FIG. 17, in response to the user pushing one edge part of an upper surface of the handle member 1910 such that the knob 1900 tilts in a certain direction, the second protruding part 1930 formed at the side of the knob 1900 may touch a touch sensor arranged at a position corresponding to the pushed direction among the plurality of heater-selection touch sensors 1520.

As described above, the user may carry out a manipulation of selecting a heater, as well as a manipulation of adjusting the heating intensity of a heater, by using the knob according to the fifth embodiment and the knob region according to the second embodiment disclosed herein.

Figure 18:
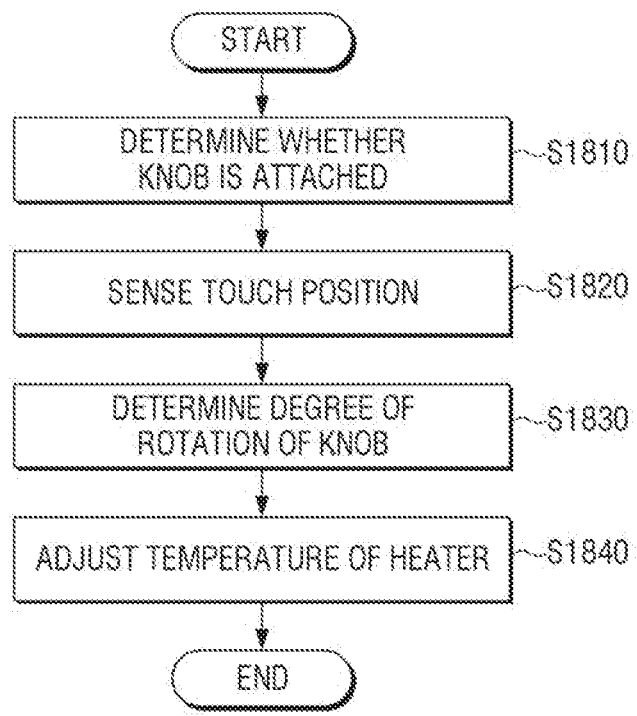
FIG. 18 is a flow chart provided to describe a method for adjusting a temperature according to an embodiment disclosed herein.

FIG. 18 is a flow chart provided to describe a method for adjusting a temperature according to an embodiment disclosed herein.

Referring to FIG. 18, a method for adjusting a temperature of a heater of an induction device includes determining whether a knob is attached to a knob region provided on one surface of a main body of the induction device (S11110). In this operation, the induction device determines whether a touch sensed by a touch sensor unit is performed by a knob or by other input unit according to an attachment state of the knob.

In response to determining that the knob is attached to the knob region, the method may further include adjusting the touch sensitivity of the touch sensor unit to be the first sensitivity, and in response to determining that the knob is not attached to the knob region, adjusting the touch sensitivity of the touch sensor unit to be the second sensitivity.

Subsequently, the touch sensor unit arranged around the knob region senses a touch position (S11120). To be specific, in response to the knob being attached to the knob region, the touch sensor unit may sense the touch position of the knob. By contrast, in a state in which the knob is not attached to the knob region and detached from the main body, the method may further include sensing that an input means other than the knob touches the touch sensor unit.

In response to the knob rotating in a state in which the knob is attached, a degree of rotation of the knob is determined according to a change of the touch position (S11130). To be specific, the touch sensor unit may include a plurality of touch sensors arranged circlewise around the knob region. In this case, the plurality of touch sensors may be touched by a protruding part formed on an edge part of a lower surface of the knob.

In a state in which the knob is detached from the main body and the plurality of touch sensors of the touch sensor unit are exposed, at least one of the plurality of touch sensors may be touched by a user's finger.

In response to the knob rotating in the state in which the knob is attached, the degree of rotation and a direction of rotation of the knob may be determined according to an order and the number of the plurality of touch sensors touched by the protruding part of the knob.

In response to the user touching the plurality of touch sensors of the touch sensor unit along a circular route where the plurality of touch sensors are arranged, a moving distance and a moving direction of the touch by the user's finger may be determined according to the order and the number of the touched touch sensors.

Subsequently, a temperature of a heater is adjusted according to the degree of rotation of the knob determined in Operation S11130 (S11140). To be specific, a setting value for the temperature of the heater may be changed greatly with a greater degree of rotation of the knob. In this case, the temperature of the heater may be adjusted in the manner of being changed by an amount of a predetermined temperature range every time a touch to an adjacent touch sensor among the plurality of touch sensors is sensed.

Further, the temperature of the heater may be increased or decreased according to the to the direction of rotation of the knob determined in the previous operation. To be specific, in response to sensing a touch with respect to the touch sensors arranged at the right side, the induction device may determine the direction of rotation as a right direction and increase the temperature of the heater. By contrast, in response to sensing a touch with respect to the touch sensors arranged at the left side, the induction device may determine the direction of rotation as a left direction and decrease the temperature of the heater.

In response to a touch by an input means other than the knob being sensed by the touch sensor unit in the state in which the knob is detached from the main body, the method may further include adjusting the temperature of the heater according to a touch position of the input means. In this case, the induction device may determine a change amount of the temperature of the heater and determine whether to increase or decrease the temperature according to the moving distance and the moving direction of the input means determined in the previous operation.

According to the method for adjusting a temperature of a heater of this embodiment, it is possible to enable the user to manipulate the temperature of the heater by using the knob and control the temperature of the heater by using a finger in case the user loses the knob.

The method for adjusting a temperature according to an embodiment disclosed herein may be realized in the induction device of FIG. 2. Further, the method may be realized by a program code stored in diverse types of recording mediums and executed by a Central Processing Unit (CPU) or the like.

To be specific, the code for executing the above-described methods may be stored in various types of recording mediums readable by a terminal, for example, a Random Access Memory (RAM), a flash memory, a Read Only Memory (ROM), an Erasable Programmable ROM (EPROM), an Electronically Erasable and Programmable ROM (EE-PROM), a register, a hard disc, a removable disc, a memory card, a Universal Serial Bus (USB) memory, a Compact Disc ROM (CD-ROM), or the like.

Figure 19:
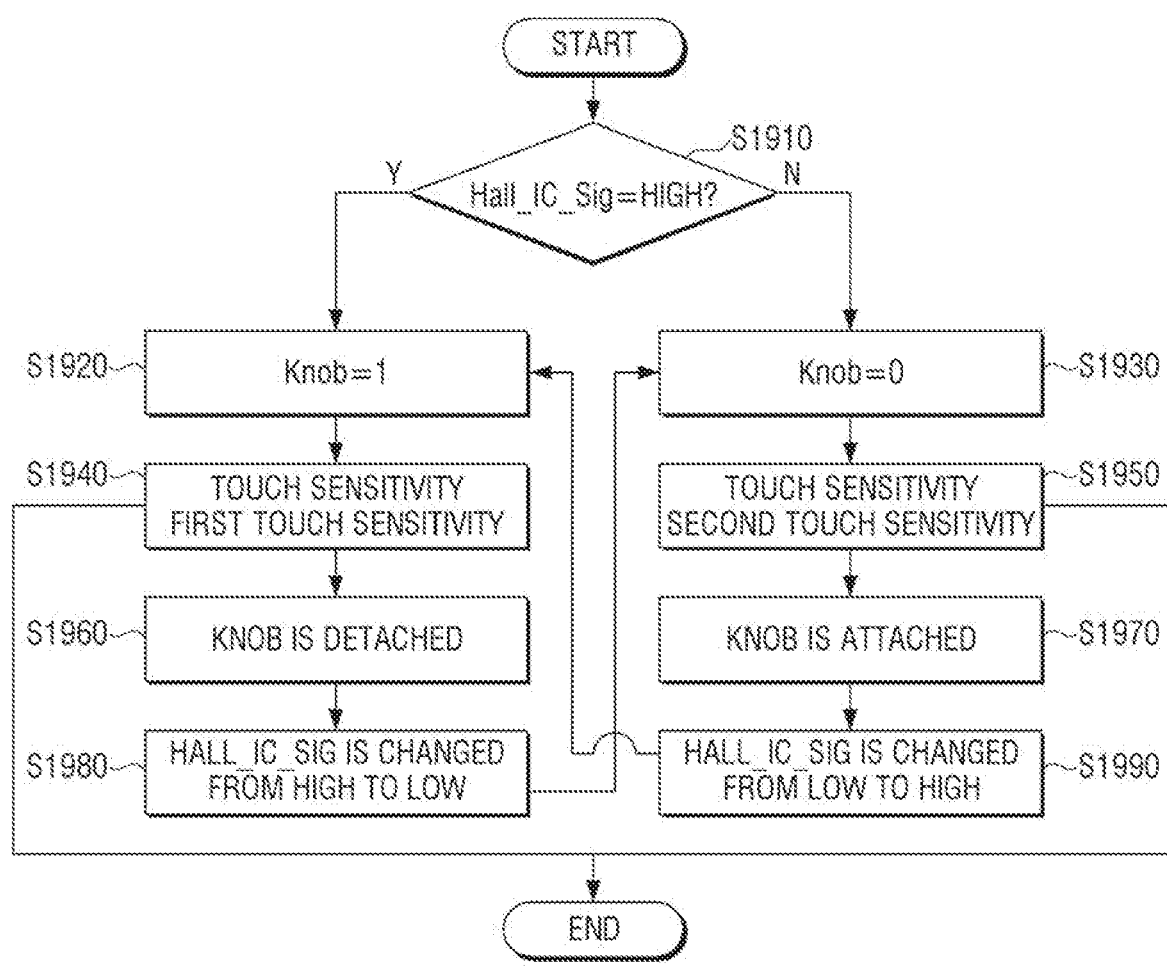
FIG. 19 is a flow chart provided to describe a method for adjusting touch sensitivity according to an embodiment disclosed herein.

FIG. 19 is a flow chart provided to describe a method for adjusting touch sensitivity according to an embodiment disclosed herein.

Referring to FIG. 19, as a signal for determining whether a knob is attached, the method includes determining whether a signal value of a hall sensor corresponds to 'HIGH' indicating a degree greater than a predetermined threshold (S11210).

In response to determining that the signal value of the hall sensor corresponds to 'HIGH' (S11210: Y), it is determined that the knob is attached (S11220). In this case, a processor may allocate a memory indicating the attachment state of the knob and set a variable identifier to be 'KNOB.' In this case, a value '1' may be substituted into the variable identifier 'KNOB.'

Subsequently, the touch sensitivity of a touch sensor unit is adjusted to be first touch sensitivity which is the touch sensitivity suitable for the attached knob (S11240). In this case, the first touch sensitivity may be more sensitive than the second touch sensitivity for a touch by a user's hand.

As a next operation, the knob is detached from a main body due to occurrence of a certain event while the knob is attached and used to the main body (S11260).

Consequently, the signal value of the hall sensor sensing the detachment of the knob is changed from 'HIGH' to 'LOW' (S1980).

In the previous operation S11210, in response to the signal value of the hall sensor for determining whether the knob is attached not being 'HIGH' (S11210:N), or in response to the signal value of the hall sensor being changed to 'LOW' as the knob is detached during use, the processor may determine that the knob is removed, and a value '0' may be substituted into the variable identifier 'KNOB' (S11230).

In a state in which the knob is detached, the touch sensitivity of the touch sensor unit is adjusted to be the second touch sensitivity on the premise that a touch input is commonly performed by a user's hand or by an input means in a highly conductive material (S11250).

The user attaches the knob to the knob region of the main body in order to use the knob (S11270).

Consequently, the signal value of the hall sensor sensing the attachment of the knob is changed to 'LOW' to 'HIGH' (S1990).

The processor determines that the knob is attached based on the changed signal value of the hall sensor, substitute the value '1' into variable identifier 'KNOB' (S11220), and repeats the previous operations.

According to the method for adjusting the touch sensitivity an embodiment disclosed herein, it is possible solve the problems of malfunction or poor recognition rate with respect to a touch by determining whether the knob is attached through a hall sensor and applying different touch sensitivities depending upon a determined result.

In the above-described embodiments, the structure consisting of a knob, a touch sensor unit, and a control unit and a method thereof are used to adjust heating strength of a heater of an induction device, but this is only an example, and it is obvious to a person having ordinary skill in the art (hereinafter referred to as 'those skilled in the art') that the structure of the present disclosure may be applied to other electronic devices.

As an example, the structure may be applied to a microwave oven for heating the food with electromagnetic waves. In this case, a knob region including a touch sensor unit and a knob may be provided to adjust an operating time and/or heating strength of the microwave oven.

As another example, the structure may be applied to a refrigerator for storing the food. In this case, a knob and a knob region according to an embodiment disclosed herein may be provided on a closed-type surface of the refrigerator.

So far, it has been described that entire components in the above embodiments of the present disclosure are combined as one component or operate in combination with each other, but the embodiments disclosed herein are not limited thereto. That is, unless it goes beyond a range of purpose of the present disclosure, the entire components may be selectively combined and operate as one or more components. Further, each of the entire components may be realized as independent hardware, or some or all of the components may be selectively combined and realized as a computer program having a program module which performs a part or all of the functions combined in one piece or a plurality of pieces of hardware.

The codes and code segments constituting the computer program may be easily derived by those skilled in the art. The computer program may be stored in a non-transitory computer readable medium to be read and executed by a computer thereby realizing the embodiments of the present disclosure.

The non-transitory computer recordable medium refers to a machine-readable medium that stores data permanently or semi-permanently unlike a register, a cache, or a memory that stores data for a short time. Particularly, the above-described various applications and programs may be stored in and provided through the non-transitory computer recordable medium, such as, a Compact Disc (CD), a Digital Versatile Disk (DVD), a hard disk, a Blu-ray disk, a Universal Serial Bus (USB), a memory card, a Read-Only Memory (ROM), or the like.

As above, a few embodiments have been shown and described. The foregoing embodiments and advantages are merely exemplary and are not to be construed as limiting the present inventive concept. The present teaching can be readily applied to other types of devices. Also, the description of the embodiments is intended to be illustrative, and not to limit the scope of the claims, and many alternatives, modifications, and variations will be apparent to those skilled in the art.

What is claimed is:

1. An induction device comprising:
a main body comprising a heater, a first magnetic substance arranged at a lower side of a knob region, and a hall sensor arranged on the knob region provided on one surface of the main body;
a knob configured to be attachable to or detachable from the knob region, the knob comprising a protruding part formed at a lower side of the knob and a second magnetic substance having opposite polarity with respect to the first magnetic substance, the hall sensor being arranged on one side of the knob region to sense a change of a magnetic field based on an approach of the second magnetic substance toward the first magnetic substance,
touch sensors formed around the knob region; and
a controller configured to:
identify whether the knob is attached or detached based on an output of the hall sensor obtained based on the approach of the second magnetic substance toward the first magnetic substance,
select a first touch sensitivity based on the knob being attached to the knob region, and a second touch sensitivity based on the knob not being attached to the knob region,
based on the knob rotating in a state in which the knob is attached to the knob region, identify a touch position where the protruding part of the knob is in contact with one of the touch sensors based on the first touch sensitivity,
in a state in which the knob is detached from the knob region, identify a touch position where an object is in contact with one of the touch sensors based on the second touch sensitivity, and
adjust a temperature of the heater based on the identified touch position.

2. The device as claimed in claim 1, wherein the touch sensors are arranged circlewise around the knob region,
wherein the protruding part is formed on an edge part of a lower surface of the knob, and
wherein the controller is configured to, based on the knob rotating in a state in which the knob is attached to the knob region, identify the degree of rotation and a direction of rotation according to an order and the number of the plurality of touch sensors touched by the protruding part.

3. The device as claimed in claim 1, wherein the heater is a plurality of heaters,
wherein the induction device further comprises a heater selector touch sensor configured to be additionally provided outside around the touch sensors and in response to the knob being pushed so as to tilt in a certain direction in a state in which the knob is attached, touch the knob in a pushed direction, and
wherein in response to the heater selector touch sensor touching the knob, the controller selects a heater corresponding to the pushed direction of the knob as a controlled heater from among the plurality of heaters.

4. The device as claimed in claim 1, wherein the knob region is formed in a dented structure dented concavely on an upper panel of the main body,
wherein the lower surface of the knob is formed in a raised structure so as to correspond to the dented structure.

5. The device as claimed in claim 1, wherein the knob region is formed in a raised structure which extends convexly on the upper panel of the main body, and
wherein the lower surface of the knob is formed in a dented structure so as to correspond to the raised structure.

* * * * *